July 8, 1941.  F. T. BARR  2,248,734
MANUFACTURE OF HYDROCARBON PRODUCTS BY HYDROGENATION OF OXIDES OF CARBON
Filed June 12, 1940
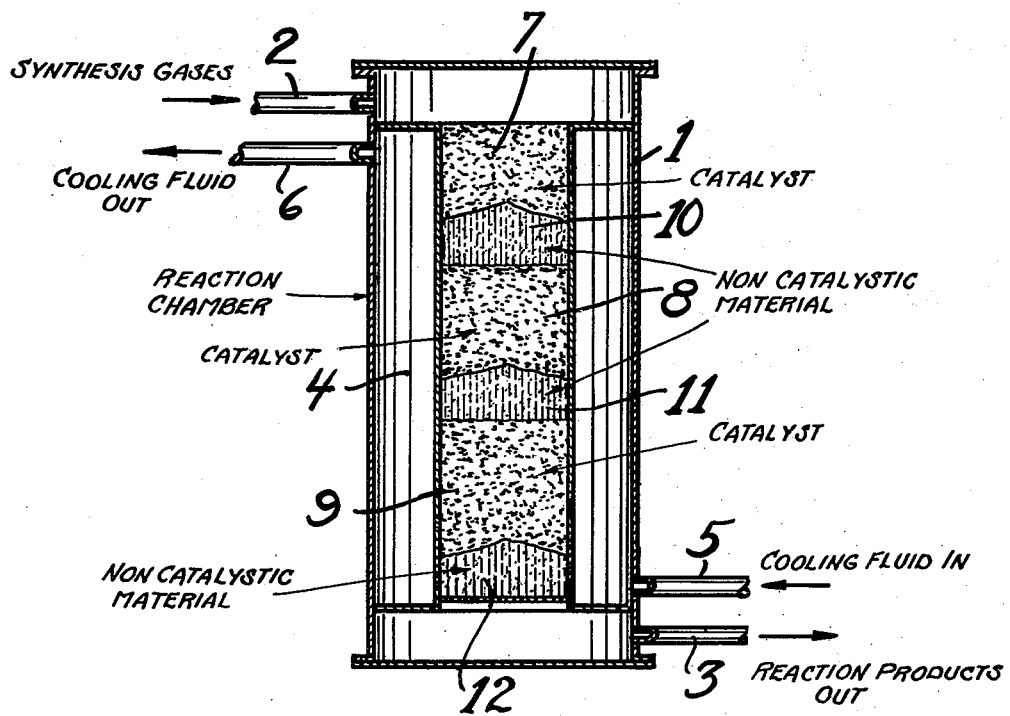

Patented July 8, 1941

2,248,734

UNITED STATES PATENT OFFICE 2,248,734

MANUFACTURE OF HYDROCARBON PRODUCTS BY HYDROGENATION OF OXIDES OF CARBON

Frank T. Barr, Summit, N. J., assignor to Standard Oil Development Company, a corporation of Delaware Application June 12, 1940, Serial No. 340,061

7 Claims. (Cl. 260—449)

The present invention relates to the manufacture of hydrocarbon constituents containing more than one carbon atom in the molecule by a process involving the hydrogenation of carbon oxides. The invention is more particularly concerned with an improved method of controlling the rapid isothermic reaction and maintaining the temperature of the reaction within a predetermined critical temperature range. In accordance with the present process, the reactors are so constructed as to provide alternate catalytic sections having disposed intermediate the respective sections, zones containing inert solid constituents which serve to function to maintain a substantially complete uniform temperature throughout the cross section of the flowing gases.

It is known in the art to conduct various isothermic chemical reactions and to remove the heat of reaction by suitable means. These means usually comprise liquid cooling mediums which are circulated without or within the reaction zone. These methods of regulating the temperatures of various processes, while entirely satisfactory for most operations, have the disadvantage that the temperature is relatively difficult to control within a narrow temperature range in operations involving the hydrogenation of oxides of carbon. A temperature gradient is created across the path of the flowing synthesis gases in a manner that the synthesis gases adjacent to the surface adjacent to the cooling medium are relatively cool as compared to the gases in the central area of the path of the flowing gases. When liquid cooling mediums are circulated within the reaction zone, there exists a tendency to disturb the equilibrium conditions of the reaction and to impair the quality of the final products. These disadvantages resulting from the lack of adequate temperature control are particularly aggravated in a process involving the production of hydrocarbon constituents containing more than one carbon atom in the molecule by the hydrogenation of oxides of carbon.

Thus in processes of this character in order to overcome the above mentioned disadvantages and to satisfactorily control the temperature of the reaction zone, it has been the practice to employ reaction zones having a relatively small diameter packed throughout with a suitable catalyst. These reaction zones usually comprise tubes of relatively small diameter or elements each consisting of one tube concentrically situated within a larger diameter tube or chamber, the intervening annular space being relatively thin. An indirect removal of heat of reaction is accomplished by introducing a cooling medium outside the single tube element, or outside the outer tube and inside the inner tube of the concentric tubes element, the catalyst being situated within and between the tubes respectively. While this arrangement permits, under certain conditions, a means of satisfactorily controlling the temperature of the reaction, it possesses an inherent disadvantage in that, owing to the necessity of using relatively small diameter of the tubes, the catalyst capacity per tube is low. This materially increases the cost of operations of this character and in many instances renders them commercially uneconomical. For example, in processes in which relatively higher boiling hydrocarbon constituents are manufactured from carbon oxides and hydrogen, it is essential that the temperature not vary substantially from the predetermined operating temperature since an increase in temperature of as litle as 5° F. to 10° F. will oftentimes result in a rise of rate of reaction so that a runaway temperature is experienced and the reaction rapidly shifts to the synthesis of methane and undesirable products to the complete exclusion of the desired liquid hydrocarbon products. Thus it has been the practice to employ relatively complicated and expensive equipment which generally comprises utilizing relatively small diameter tubes of a diameter of one-half inch or less or equivalent reaction zones. While this arrangement permits, under certain conditions, a means of satisfactorily controlling the temperature of the reaction, it possesses an inherent disadvantage in that, due to the relatively small diameter tubes, the capacity of the reactor is relatively low.

The use of relatively inexpensive larger diameter tubes has heretofore not been successful since it has been found that the yields of the desired liquid products are relatively low. This is due to the fact that a high temperature gradient as disclosed above develops across the path of the flowing synthesis gases.

I have now found a method by which this cross section temperature gradient may be controlled which comprises inserting at intervals along the reaction zone sections of non-catalytic material to bring the entire gas mass to a uniform temperature. On passing from each non-catalytic zone to the next catalytic zone, the temperature gradient set up at the end of the previous catalytic zone across the cross section of the gas will be eliminated. The process of my invention may be readily understood by reference to the attached drawing illustrating modifications of the same. For purposes of description the invention is described with respect to an over-all operation for the manufacture of hydrocarbon constituents containing more than one carbon atom in the molecule from said synthesis gases comprising hydrogen and oxides of carbon. The feed gases comprising oxides of carbon and hydrogen are introduced into catalyst reaction zone 1 by means of feed line 2. These gases flow downwardly through reaction zone 1 under temperature and pressure conditions adapted to produce hydrocarbon constituents containing more than one carbon atom in the molecule, and are finally withdrawn from the reaction zone by means of line 3. The synthesized gases withdrawn by means of line 3 may be handled in any manner desirable for the segregation of the desired liquid products from the unsynthesized gases, inert gases, and other undesirable products. This is usually accomplished by conventional means which are adapted to recover valuable hydrocarbon constituents from gases containing the same. If desired, a portion of the gases withdrawn from the reaction zone 1 by means of line 3 may be recycled to the reaction zone. The heat of reaction is removed from reaction zone 1 and the temperature controlled within the desired relatively narrow critical temperature range by means of a suitable liquid cooling medium which is introduced into cooling jacket 4 surrounding the reaction zone by means of line 5. The cooling fluid is withdrawn from jacket 4 by means of line 6 and may be cooled and recycled to the jacket.

The feed synthesis gases flow downwardly through reaction zone 1 and contact successive alternate beds of catalytic and non-catalytic material. Thus the feed synthesis gases contact catalyst beds 7, 8 and 9 and non-catalyst beds 10, 11 and 12 in the manner described. The synthesis gases are introduced into the reaction zones preferably under conditions at which the desired reaction will be initiated. After the synthesis gases contact the catalyst bed 7, the reaction proceeds with the evolution of exothermic heat. The temperature of the outer portions of the synthesis gases in direct contact with the shell of the cooling jacket is maintained relatively low, while the temperature of the inner portions of the synthesis gases increases a substantial amount, as is mentioned by the effect of temperature rise on the rate and control of the reaction. Thus, as the synthesis gases emerge from the catalyst zone 7, a temperature gradient exists between the inner portions of the synthesis gases and the outer portions in contact with the cooling jacket, and a flow of heat in that direction results. In accordance with the present process, these synthesis gases then pass through a non-catalytic zone wherein time and contact conditions are adapted to remove that part of the heat of reaction which has not been removed in the preceding catalytic section and to absorb the same by the cooling medium in the cooling jacket and to secure a uniform temperature throughout the cross section of the flowing gases. In a similar manner the gases successively pass through catalyst zone 8, non-catalytic zone 11, catalyst zone 9, non-catalytic zone 12 and then are withdrawn from the system by means of line 13 and handled as described.

The present process may be widely varied. The invention essentially comprises passing synthesis gases through an alternate plurality of catalytic and non-catalytic zones arranged in a manner to remove the exothermic heat of reaction and to maintain a relatively constant temperature within the reaction zone and to prevent a temperature gradient across the cross section of the flowing synthesis gases. Although the process may be adapted to the removal of exothermic heat of reaction and for maintaining a substantially constant temperature in any type of chemical reaction, it is particularly adapted for a process for the production of relatively higher boiling hydrocarbon constituents from oxides of carbon and hydrogen. These reactions, depending upon the character of the feed gases and yield of particular product desired, may be conducted under various temperature and pressure conditions. In general, however, in a process for the production of hydrocarbon constituents containing more than one carbon atom in the molecule, it is preferred to have a temperature of the reaction in the range from about 370° F. to 410° F. In order to secure satisfactory yields of the desired product, it is essential that the temperature variance from the operating temperature not exceed about 10° F., and preferably not exceed about 5° F.

Any suitable catalyst may be employed which will function to aid the reaction between the hydrogen and the oxides of carbon at the operating temperatures and pressures. Suitable catalysts are for example cerium, chromium, cobalt, manganese, osmium, palladium, titanium, zinc, iron and oxides or other compounds of these metals. Mixtures of these catalysts may be employed or the same may be impregnated with suitable agents adapted to increase their efficiency or strength. The catalysts may be in pilled form or granular form.

The non-catalytic zones may contain any suitable solid material which will not function to aid the reaction and which preferably has a relatively high heat conductivity. The non-catalytic material may be of any suitable size which will serve to transmit the heat and also serve to agitate the flowing gases. The prime requisites of the non-catalytic zones are that they promote mixing of the flowing gases and readily transmit the heat of reaction from the center portions of the reaction gases to the walls of the cooling tube jacket. Any solid material of this character is suitable. Preferred substances are for example non-catalytic clays or various non-catalytic metallic oxides or related compounds.

The catalytic zones may be of the same depth. However, it is advantageous to arrange the size and disposition of each catalyst zone so as to promote optimum operation under the particular conditions of temperature, concentration, and rate of reaction which develop there and which depend on the initial conditions of temperature, concentration, and throughput chosen. A particularly desirable arrangement with respect to the non-catalytic zones is to arrange these zones in a manner that the center portions of the flowing synthesis gases first enter the non-catalytic zones and the outer portions of the flowing synthesis gases in contact with the tube wall chamber of the cooling jacket last enter the non-catalytic zones.

By conducting the operation in accordance with the present process, the entire quantity of the heat of reaction is preferably removed in the usual fashion through the tube wall of the cooling jacket surrounding the catalytic and non-catalytic masses. However, under certain conditions the operation may be conducted so that a portion of the heat of reaction is not removed by this means but is removed by means of a cooling medium circulated through the cooling zones, recooled without the reaction chamber and recycled to the respective zones.

In order to further illustrate the present invention the following example is given which should not be construed as limiting the same in any manner whatsoever. In a reaction in which hydrocarbon constituents containing more than one carbon atom in the molecule are produced by reacting oxides of carbon with a hydrogen in order to secure satisfactory yields, it was necessary to employ reaction zones one-half inch in diameter packed with a catalyst. The temperature of the reaction zone was maintained substantially constant by circulating without the half-inch reaction zones a cooling medium. When this reaction was conducted, employing catalyst zones two inches in diameter, it was found that it was not possible to satisfactorily control the temperature by circulating a cooling medium without the respective zones. However, when the reaction was conducted in accordance with the present process employing two inch reaction zones, it was found that the heat of reaction was readily removable by a cooling medium circulated without the zone and that satisfactory yields of a relatively high quality product were secured.

By employing the present process, a greater heat removal per unit of transfer material is obtained. It is possible accordingly to employ reaction zones the cross section of which is from two to ten times the cross section which could ordinarily be employed using conventional means. The process also permits a higher through-put, a better temperature control, and a greater yield of the desirable liquid products. The efficiency of the entire operation is materially increased and substantial economies effected.

Although the process is especially adapted for operations conducted in relatively long reaction zones, it may be adapted to various other types and designs of reaction zones. Neither the catalytic zones nor the non-catalytic zones need be of the same length at all positions and an improved operation is secured by adjusting the length of the respective zones, depending upon their position in the reaction chamber.

What I claim as new and desire to protect by Letters Patent is as follows.

I claim:

1. Process for the removal of heat from an exothermic reaction conducted in the presence of a catalyst which comprises passing the reacting gases through a plurality of alternate zones containing catalyst which promotes said reaction and non-catalytic material situated within a reaction chamber, removing heat of reaction through the walls of said reaction chamber, whereby a temperature gradient across the path of the flowing gases is prevented.

2. Process in accordance with claim 1 in which the catalyst is selected from the class of materials having the ability to increase the reaction rate in a process involving the hydrogenation of carbon oxides and in which the non-catalytic material is a solid material having a relatively high heat transfer rate.

3. Process in accordance with claim 1 in which the heat of reaction is removed through the walls of the reaction chamber by circulating a cooling medium in a jacket without the reaction chamber.

4. A process for the removal of a heat of reaction and for maintaining a relatively constant temperature in a reaction involving the hydrogenation of oxides of carbon for the production of hydrocarbon constituents containing more than one carbon atom in the molecule which comprises passing feed gases containing oxides of carbon and hydrogen through a plurality of alternate zones containing solid catalytic material promoting said reaction and solid non-catalytic material, situated within a reaction chamber under conditions adapted to hydrogenate the oxides of carbon and removing the heat of reaction through the walls of the reaction chamber, whereby a temperature gradient across the path of the flowing gases is prevented.

5. A process for the removal of the heat of reaction and for maintaining a relatively constant temperature in a reaction involving the hydrogenation of oxides of carbon for the production of hydrocarbon constituents containing more than one carbon atom in the molecule which comprises passing feed gases through a plurality of alternate zones containing catalyst promoting said reaction and non-catalytic solid material situated within a reaction chamber, said zones containing catalysts being of the character that the time of contact of the gases and the catalyst increases in the respective zones in the direction of flow of the feed gases.

6. Process for the removal of heat from an exothermic reaction conducted in the presence of a catalyst which comprises passing the reacting gases through a plurality of alternate zones containing catalytic material promoting said reaction and non-catalytic material situated within a reaction chamber, said zones containing non-catalytic material being of the character that the center portion of the flowing gases enter the non-catalytic zones before the outer portions of said gases in contact with the walls of the reaction chamber enter said zones, whereby a temperature gradient across the path of the flowing gases is prevented.

7. A process for the removal of a heat of reaction and for maintaining a relatively constant temperature in a reaction involving the hydrogenation of oxides of carbon for the production of hydrocarbon constitutents containing more than one carbon atom in the molecule which comprises passing feed gases containing oxides of carbon and hydrogen through a plurality of alternate zones containing solid catalytic material promoting said reaction and solid non-catalytic material, situated within a reaction chamber, said zones containing non-catalytic material being of the character that the center portions of the flowing gases enter the non-catalytic zones before the outer portions of said gases in contact with the walls of the reaction chamber enter said zones, whereby a temperature gradient across the path of the flowing gases is prevented.

FRANK T. BARR.